United States Patent [19]

Schlüter

[11] 3,975,128

[45] Aug. 17, 1976

[54] SYSTEM FOR FILLING A MOLD WITH REACTIVE SYNTHETIC-RESIN COMPONENTS

[75] Inventor: Klaus Schlüter, Munich, Germany

[73] Assignee: Krauss-Maffei Aktiengesellschaft, Munich, Germany

[22] Filed: May 28, 1974

[21] Appl. No.: 474,021

[30] Foreign Application Priority Data
May 29, 1973  Germany............................ 2327269

[52] U.S. Cl.............................. 425/207; 425/200; 425/244; 425/252; 425/217
[51] Int. Cl.²........................................... B29G 3/00
[58] Field of Search............ 425/244, 245 R, 817 R, 425/4 R, 207, 200, 252

[56] References Cited
UNITED STATES PATENTS

| | | | |
|---|---|---|---|
| 2,478,013 | 8/1949 | Roddy.............................. | 425/247 X |
| 2,703,435 | 3/1955 | Watson............................ | 425/252 X |
| 3,299,475 | 1/1967 | Carlson et al..................... | 425/244 |
| 3,706,515 | 12/1972 | Keuerleter et al................. | 425/252 X |
| 3,723,037 | 3/1973 | Formo............................. | 425/244 X |
| 3,776,989 | 12/1973 | Annis, Jr. et al................ | 425/244 X |

Primary Examiner—Francis S. Husar
Assistant Examiner—David S. Safran
Attorney, Agent, or Firm—Karl F. Ross; Herbert Dubno

[57] ABSTRACT

A housing is formed with a quieting chamber which opens in one direction into a mold and with a mixing chamber opening in another direction at right angles to the first-mentioned direction into the quieting chamber. A pair of reactive components are introduced into the mixing chamber to form a mixture therein. Thereupon a mixing piston or plunger is shifted along this mixing chamber at right angles to the quieting chamber so as to force the mixture out of the mixing chamber and into the quiescence chamber. This piston at the end of its stroke lies with its end face flush and contiguous with a planar inner surface of the quieting chamber. Thereupon a displacement piston or plunger moves the full length of the quieting chamber so as to press the mixture from this chamber into the mold. The quieting chamber has the cross-sectional shape of a circular segment and the mixing chamber is of uniform circular cross-section.

10 Claims, 6 Drawing Figures

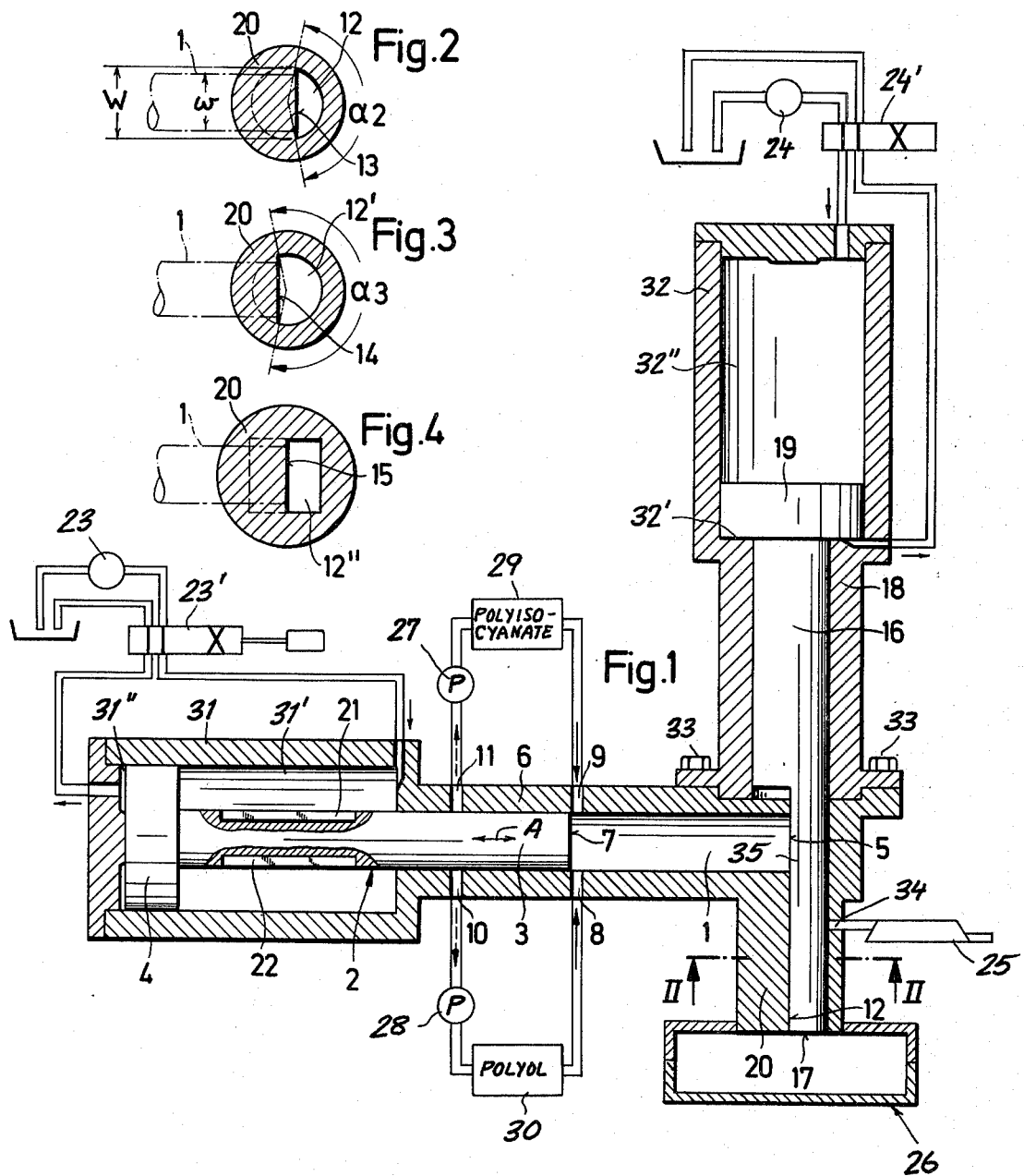

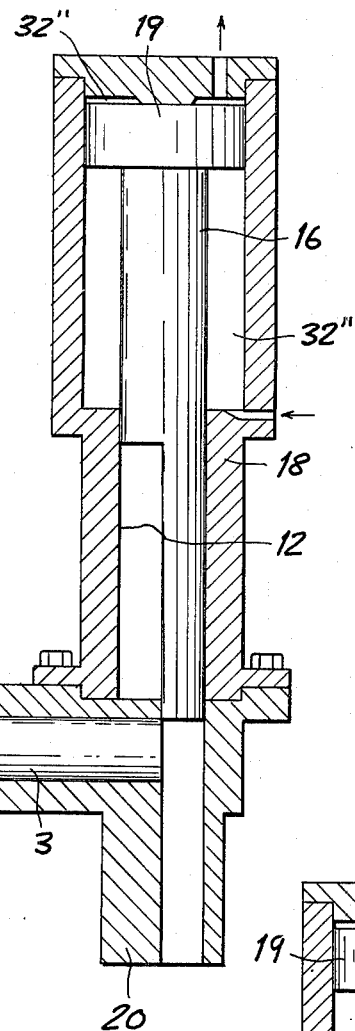
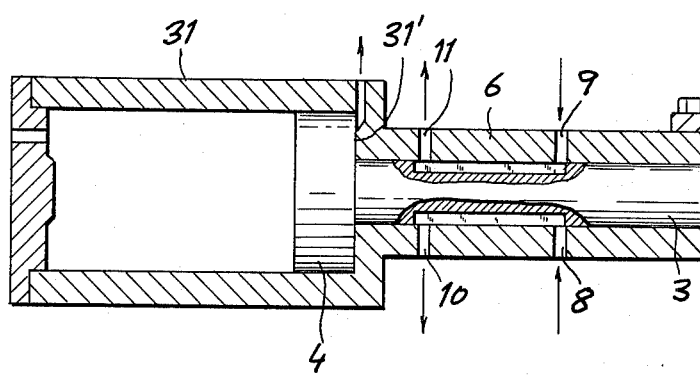
FIG. 6
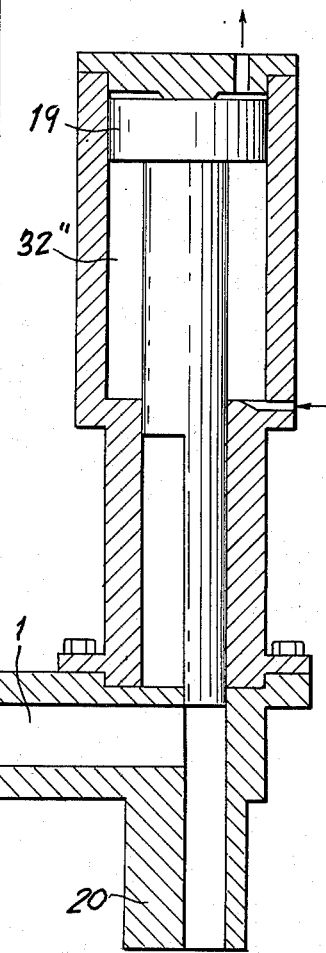
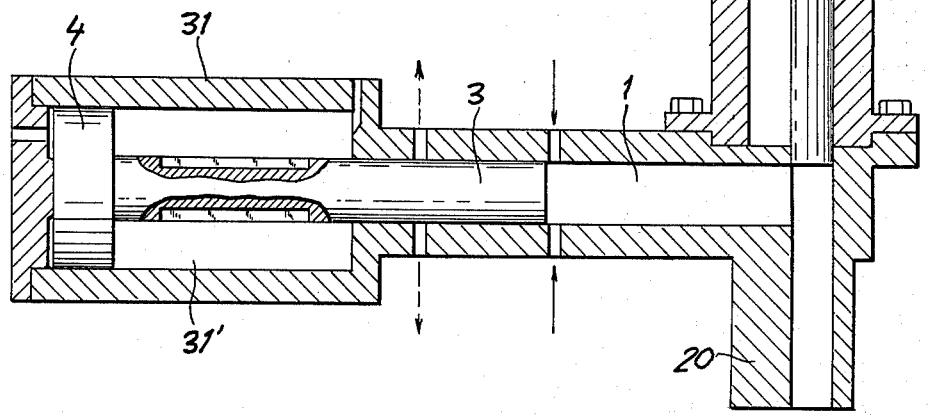
FIG. 5

SYSTEM FOR FILLING A MOLD WITH REACTIVE SYNTHETIC-RESIN COMPONENTS

CROSS-REFERENCE TO RELATED APPLICATIONS

This application is related to the commonly assigned and copending applications Ser. No. 212,186 filed Dec. 17, 1971, Ser. No. 425,114 filed Dec. 17, 1973, and 460,573 filed Apr. 12, 1974.

FIELD OF THE INVENTION

The present invention relates to an apparatus for filling a mold. More particularly this invention concerns the filling of a mold with reactive components, such as are used in the forming of polyurethane bodies by injection molding.

BACKGROUND OF THE INVENTION

In the production of injection-molded synthetic-resin articles of reactive components it is necessary to mix together the two components immediately before or as they are introduced into the cavity of the mold. The reaction is frequently relatively violent and involves the generation of gases which can cause the mixture to bubble considerably. As a rule the two components mix together in a mixing chamber and are then fed via a quieting chamber to the mold cavity.

In one known arrangement the quieting chamber has two lobes acting as diffusers. This quieting chamber must further be formed with a relatively narrow mouth opening into the mold so that the sprue formed thereby on the molded body will be readily removable.

The principal difficulty with this system is that the material hardens within the quieting chamber each time the apparatus is cycled so that additional mechanism must be provided to flush and/or punch out the hardened material. Such mechanism considerably increases the cost of the apparatus.

Another disadvantage of such a system is that the molding material is fed into the mold cavity while still reacting so that this material frequently bubbles up in the mold cavity and indeed overflows this cavity. As a matter of fact it is not uncommon in such systems to lose more than half the workpieces or to be required to cut down and machine the workpieces after molding so as to be able to use them.

OBJECTS OF THE INVENTION

It is therefore an object of the present invention to provide an improved apparatus for filling a mold.

Another object of this invention is the provision of such an apparatus which is relatively inexpensive and which can be relied upon to regularly produce workpieces of good quality.

SUMMARY OF THE INVENTION

These objects are attained according to the present invention in a mold-filling system wherein a housing is formed with a quieting chamber opening in one direction directly into the mold and with a mixing chamber opening in another direction transverse to the one direction into the quieting chamber. A piston is provided in the quieting chamber and means is provided for introducing a pair of reactive components into the mixing chamber and for displacing this mixture in the other direction into the quieting chamber. The piston is reciprocated in the one direction toward the mold so as to displace the charge of mixture from the quieting chamber into the mold.

In accordance with further features of this invention the mixing chamber is provided with a reciprocal piston having an end face displaceable between an advanced position wherein this end face lies flush and contiguous with the inner surface of the quieting chamber and a retracted position spaced in the mixing chamber away from this surface of the quieting chamber. Thus this piston is moved across the mixing chamber to completely empty this mixing chamber into the quieting chamber and then the piston in the quieting chamber is similarly moved through its chamber so as to transfer the mixture into the mold. The system according to the present invention is advantageous in that the reaction takes place completely within the mixing chamber and thereafter the well mixed components are injected as a body into the mold cavity. Since the quieting chamber is of uniform cross-sectional size and opens directly into the mold cavity these components do not undergo the normally considerable amount of shear and compression as they are forced from the quieting chamber through a narrow mouth into the mold. Therefore these materials can be fed into this mold without fear that they bubble up and impair the molding operation. It has been found that causing the mixture to flow around a right angle as it exits from the mixing chamber has a particularly effective quieting effect on the mixture so that it can thereafter be injected into the mold as a relatively smooth fluid.

In accordance with another feature of this invention at least one portion of the inner surface of the quieting chamber is formed as a planar region and the mixing chamber opens into the quieting chamber at this planar region. The width of the opening of the mixing chamber into the quieting chamber is narrower than the width of the planar region so that when the piston has a planar end face it can be held in a position exactly flush and contiguous with this surface so as to allow the piston of the quieting chamber to neatly sweep all of the mixture out of the quieting chamber and into the mold.

According to yet another feature of this invention the quieting chamber is of uniform cross-sectional area and formed either as a polygon, such as a rectangle, or as a circular segment. In addition the cross-sectional area of the quieting chamber is at least the same size as that of the mixing chamber. More particularly, it is advantageous that the amount of fluid displaced on the stroke of the mixing piston be the same as that displaced on each stroke of the quiescence piston.

BRIEF DESCRIPTION OF THE DRAWING

The above and other objects, features and advantages will become more readily apparent from the following, reference being made to the accompanying drawing in which:

FIG. 1 is a vertical section through the apparatus according to the present invention;

FIG. 2 is a section taken along line II—II of FIG. 1;

FIGS. 3 and 4 are sections similar to FIG. 2 illustrating other configurations of the quieting chamber according to this invention; and FIGS. 5 and 6 are sections similar to FIG. 1 illustrating the machine in two other operative positions.

SPECIFIC DESCRIPTION

As shown in FIGS. 1 and 2, the apparatus according to the present invention comprises a first housing 6 forming a cylindrical mixing chamber 1 which can be periodically emptied by a pump arrangement 2. Another housing 18 is connected via screws 33 to this housing 6 and is provided with a reciprocal piston 16. In addition, the housing 6 is formed with a quieting chamber 12 of circularly segmental section (FIG. 2) and extending at a right angle to the chamber 1.

The pumping arrangement 2 comprises a piston 3 having a planar end face 7 which is reciprocal in the direction shown by arrow A. The piston 3 is carried on a relatively large-diameter piston 4 reciprocal in a chamber 31 subdivided by this piston 4 into a pair of chambers 31' and 31" which can be alternately pressurized and depressurized by a pump 23 through a distributing valve 23'. In addition, the piston 3 is formed with a pair of laterally open recesses 21 and 22 which in the advance position of this piston shown in FIG. 6, allows fluid communication between a pair of inlet orifices 8 and 9 and a pair of respective outlet orifices 10 and 11. A pump 27 passes polyisocyanate from a supply 29 into the inlet 9 and draws it out of the outlet 11. Another such pump 28 passes polyol from a supply 30 into the inlet 8 and can draw it out of the outlet 10. In the retracted position of the piston 3 the face 7 lies just in back of the two inlets 8 and 9, as shown in FIGS. 1 and 5.

The housing 18 is formed with a chamber 32 subdivided by a large-diameter piston 19 into a front chamber 32' and a rear chamber 32" which can be alternately pressurized and depressurized by a pump 24 through a distributing valve 24'. A smaller-diameter piston 16 has an end section 35 of the same circularly segmental shape as the chamber 12 and reciprocal at a right angle to the piston 3, as shown by arrow B. This subsection 35 has an end face 17 which can be moved into a position flush with the inner surface of the cavity of a mold shown at 26 in FIG. 1. A bore 34 formed in the side of the housing 20 opens into the chamber 12 and is connected to a blower 25 which can be operated to inject air into the interior of the mold 26 and eject the workpiece as described in the above-cited patent application.

As shown in FIG. 2, the chamber 12 has the shape of a circular segment having an arc width $\alpha_2$ equal here to approximately 160°. A chordal plane 13 defines that face of the inner surface of the chamber 12 at which the opening 5 between the chambers 1 and 12 is formed. The opening 5 has a width $w$ which is substantially less than the width $W$ of this planar surface 13.

It is also possible to employ a chamber 12' as shown in FIG. 3 having an arc width $\alpha_3$ which is equal to approximately 200°. In this case, the planar wall 14 of the chamber 12' is of substantially the same width $W$ as the wall 13 in FIG. 2, but here the chamber has a larger overall volume.

FIG. 4 shows a further arrangement where a rectangular-section chamber 12" is employed having one wall 15 which again is wider than the width $w$ of the chamber 1. In all cases the strokes of the two pistons 16 and 3 are the same and their cross-sectional areas are the same so that the volumes displaced by them on reciprocation from one end position to the other are equal.

The apparatus functions as follows:

To start the piston 3 is held in the retracted position and the piston 16 in the advanced position shown in FIG. 1. Polyisocyanate is introduced through inlet 9 and and polyol is introduced through inlet 8 such that these two components mix and react in the chamber 1.

Then, as shown in FIG. 5, the piston 16 is retracted by pressurization of the chamber 32' and depressurization of the chamber 32" until its lower end 17 lies above the mouth 5 of the chamber 1.

Thereupon, as shown in FIG. 6, the piston 1 is advanced until its end face 7 lies flush with the wall 13 of the chamber 12. In this position of the piston 3 the polyisocyanate circulates from the inlet 9 to the outlet 11 through the recess 21 and the polyol circulates from the inlet 8 to the outlet 10 through the recess 22. Advancing of this piston 3 completely empties the chamber 1 into the chamber 12.

Then the piston 16 displaced into the position shown in FIG. 1 completely empties the chamber 12 into the mold 26. This completes one cycle of the operation. The compressor 25 may then be actuated after retraction of the piston 16 so as to force air into the mold and eject the workpiece.

Such an arrangement can be relied on regularly to produce workpieces of identical characteristics. The mixture can even be fed into open molds, since it is relatively calm when ejected from the chamber 12. Moreover, there is virtually no possibility that the material will harden in either of the chambers 1 or 12 since these chambers are both effectively emptied by their respective pistons 3 and 16.

I claim:

1. An apparatus for filling a mold, said apparatus comprising:
    a housing formed with a quieting chamber opening in one direction into said mold and with a mixing chamber opening in another direction transverse to said one direction into said quieting chamber, said quieting chamber having a cross-sectional area equal to that of said mixing chamber and a width greater than that of the inlet opening into it from said mixing chamber;
    means operatively associated with said mixing chamber for injecting a pair of reactive components into said mixing chamber in opposing and impinging jets to form a mixture therein;
    means operatively associated with said mixing chamber for displacing said mixture in said other direction into said quieting chamber;
    a piston in said quieting chamber; and
    means operatively associated with said piston for reciprocating said piston in said one direction in said quieting chamber for displacing said mixture from said quieting chamber into said mold, said quieting chamber being of uniform cross-section in said one direction and has an inner surface formed with said inlet opening, said mixing chamber being of uniform cross-section in said other direction and terminating at said opening.

2. The apparatus defined in claim 1 wherein said means for displacing said mixture in said other direction includes a mixing piston in said mixing chamber having an end face and displaceable between an advanced position with said end face flush with said surface and a retracted position with said end face spaced in said mixing chamber from said surface, said piston being formed with passages for recirculating said components in said advanced position.

3. The apparatus defined in claim 2 wherein said end face is so formed that in said advanced position of said mixing piston said end face completely fills said opening and is continuous with said inner surface.

4. The apparatus defined in claim 3 wherein said surface is planar in the region of said opening.

5. The apparatus defined in claim 4 wherein said quieting chamber is of uniform rectangular cross section.

6. The apparatus defined in claim 4 wherein said quiescence chamber is of uniform circularly segmental section having a chordal planar region, said opening lying in said planar region and being of lesser width transverse to said one direction and in its plane than said region.

7. The apparatus defined in claim 1 wherein said one direction is perpendicular to said other direction.

8. The apparatus defined in claim 1 wherein said chambers are of substantially equal cross-sectional areas.

9. An apparatus for charging a mold with a mixture of at least two interreactive components, said apparatus comprising an elongated quieting chamber opening into said mold at a wall of a mold cavity, an elongated mixing chamber extending at right angles to said quieting chamber and opening into the latter at a wall of said quieting chamber, and valve means operatively associated with said mixing chamber for controlling the flow of said components into said mixing chamber, the improvement wherein said apparatus further comprises:

said quieting chamber having a cross-sectional area equal to that of said mixing chamber and a width greater than that of the inlet opening into it from said mixing chamber, a plunger reciprocable in said quieting chamber and of a cross section complementary thereto for completely driving the mixture from said quieting chamber into said mold cavity; and abutment means engageable by said plunger for halting advance thereof with an end face of said plunger flush with said wall of said mold cavity, said valve means including a second plunger reciprocable in said mixing chamber at right angles to the first-mentioned plunger and of a cross section complementary to that of said mixing chamber for completely driving the mixture from said mixing chamber into said quieting chamber; and second abutment means engageable with said second plunger for halting the advance thereof with an end face of said second plunger flush with said wall of said chamber, each of said plungers being provided at an end remote from its end face with a piston, said apparatus further comprising respective cylinders receiving said pistons and means for pressurizing said cylinders to displace said pistons, said end face of said second piston being planar and perpendicular to the direction of displacement thereof, said wall of said quieting chamber being planar and parallel to said end face of said second piston, said first piston being formed with a flat sliding along said wall of said quieting chamber, said mixing chamber being formed with a respective pair of ports assigned to each of said components and longitudinally spaced apart in the direction of reciprocation of said second piston, means for supplying the respective component to the port of each pair proximal to the quieting chamber and for collecting the respective component from the port of each pair distal from the quieting chamber, and said second plunger being provided with respective longitudinally extending passages connecting the ports of each pair in a position of the second plunger in which its end face lies flush with said wall of said quieting chamber.

10. The improvement defined in claim 9 wherein said first plunger has a retracted position in which it fully clears the opening of said mixing chamber into said quieting chamber.

* * * * *